(12) United States Patent
Patel

(10) Patent No.: US 7,641,725 B2
(45) Date of Patent: *Jan. 5, 2010

(54) PHTHALOCYANINES AND THEIR USE IN INK-JET PRINTING

(75) Inventor: Prakash Patel, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 182 days.

This patent is subject to a terminal disclaimer.

(21) Appl. No.: 11/918,127

(22) PCT Filed: Apr. 11, 2006

(86) PCT No.: PCT/GB2006/001330

§ 371 (c)(1),
(2), (4) Date: Oct. 10, 2007

(87) PCT Pub. No.: WO2006/114569

PCT Pub. Date: Nov. 2, 2006

(65) Prior Publication Data

US 2009/0053480 A1    Feb. 26, 2009

(30) Foreign Application Priority Data

Apr. 23, 2005 (GB) .................. 0508234.2
Apr. 23, 2005 (GB) .................. 0508238.3

(51) Int. Cl.
*C09D 11/02* (2006.01)
*B41J 2/01* (2006.01)
*C09B 47/04* (2006.01)

(52) U.S. Cl. .................. 106/31.49; 347/100; 8/638; 8/661

(58) Field of Classification Search ............. 106/31.49; 347/100; 8/638, 661
See application file for complete search history.

(56) References Cited

U.S. PATENT DOCUMENTS

| | | | | |
|---|---|---|---|---|
| 4,732,615 A * | 3/1988 | Kawashita et al. | ........ | 106/31.46 |
| 5,123,960 A * | 6/1992 | Shirota et al. | ............ | 106/31.46 |
| 5,882,360 A * | 3/1999 | Bauer et al. | .................... | 8/661 |
| 6,015,896 A * | 1/2000 | Mistry et al. | ................ | 540/134 |
| 6,149,722 A * | 11/2000 | Robertson et al. | ........ | 106/31.49 |
| 6,190,422 B1 * | 2/2001 | Carr | ............... | 8/445 |
| 7,022,171 B2 * | 4/2006 | Patel et al. | ............... | 106/31.49 |
| 7,182,806 B2 * | 2/2007 | Patel | ....................... | 106/31.49 |
| 7,189,283 B2 * | 3/2007 | Patel | ....................... | 106/31.49 |
| 7,326,287 B2 * | 2/2008 | Patel | ....................... | 106/31.49 |
| 2004/0040465 A1 | 3/2004 | Andrievsky et al. | | |
| 2005/0126436 A1 * | 6/2005 | Patel et al. | ............... | 106/31.49 |
| 2008/0018719 A1 * | 1/2008 | Patel | ........................... | 347/86 |
| 2009/0027466 A1 * | 1/2009 | Patel | ........................... | 347/86 |

FOREIGN PATENT DOCUMENTS

| | | |
|---|---|---|
| DE | 196 34 354 | 3/1998 |
| EP | 0 196 901 | 10/1986 |
| EP | 1 469 047 | 10/2004 |
| JP | 61 002772 | 1/1986 |
| WO | WO 97/13811 | 4/1997 |
| WO | WO 98/49239 | 11/1998 |
| WO | WO 99/67334 | 12/1999 |
| WO | WO 03/089532 | 10/2003 |

* cited by examiner

*Primary Examiner*—Helene Klemanski
(74) *Attorney, Agent, or Firm*—Morgan Lewis & Bockius LLP

(57) ABSTRACT

A mixture of compounds of Formula (1) and salts thereof:

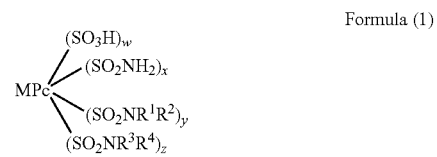

Formula (1)

wherein:
M is 2H, Si, a metal, an oxymetal group, a hydroxymetal group or a halometal group;
Pc represents a phthalocyanine nucleus;
$R^1$ is H or optionally substituted $C_{1-4}$alkyl;
$R^2$ is optionally substituted alkyl or optionally substituted heterocyclyl;
$R^3$ is H or optionally substituted $C_{1-4}$alkyl;
$R^4$ is optionally substituted hydrocarbyl;
w is 0.1 to 3.7
x is 0.1 to 3.7;
y is 0.1 to 3.7;
z is 0.1 to 3.7: and
provided that the groups represented by y and z are different.

Also compositions and inks, printing processes, printed material and ink-jet printer cartridges.

26 Claims, No Drawings

PHTHALOCYANINES AND THEIR USE IN INK-JET PRINTING

This invention relates to compounds, compositions and inks, to printing processes, to printed substrates and to ink-jet printer cartridges.

Ink-jet printing is a non-impact printing technique in which droplets of ink are ejected through a fine nozzle onto a substrate without bringing the nozzle into contact with the substrate. The set of inks used in this technique typically comprise yellow, magenta, cyan and black inks.

With the advent of high-resolution digital cameras and ink-jet printers it is becoming increasingly common for consumers to print off photographs using an ink-jet printer. This avoids the expense and inconvenience of conventional silver halide photography and provides a print quickly and conveniently.

While ink-jet printers have many advantages over other forms of printing and image development there are still technical challenges to be addressed. For example, there are the contradictory requirements of providing ink colorants that are soluble in the ink medium and yet do not run or smudge excessively when printed on paper. The inks need to dry quickly to avoid sheets sticking together after they have been printed, but they should not form a crust over the tiny nozzle used in the printer. Storage stability is also important to avoid particle formation that could block the tiny nozzles used in the printer especially since consumers can keep an ink-jet ink cartridge for several months. Furthermore, and especially important with photographic quality reproductions, the resultant images should not fade rapidly on exposure to light or common oxidising gases such as ozone.

Most cyan colorants used in ink-jet printing are based on phthalocyanines and problems of fading and shade change on exposure to light and contact with ozone are particularly acute with dyes of this class.

The present invention provides a mixture of compounds of Formula (1) and salts thereof:

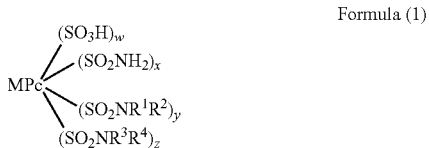

Formula (1)

wherein:

M is 2H, Si, a metal, an oxymetal group, a hydroxymetal group or a halometal group;

Pc represents a phthalocyanine nucleus of formula;

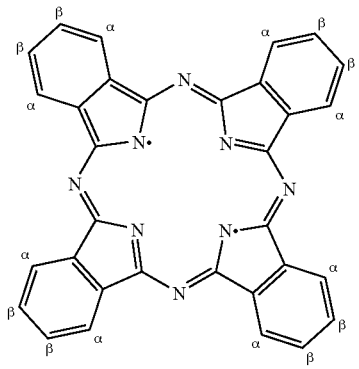

$R^1$ is H or optionally substituted $C_{1-4}$alkyl;

$R^2$ is optionally substituted alkyl or optionally substituted heterocyclyl;

$R^3$ is H or optionally substituted $C_{1-4}$alkyl;

$R^4$ is optionally substituted hydrocarbyl;

w is 0.1 to 3.7;

x is 0.1 to 3.7;

y is 0.1 to 3.7;

z is 0.1 to 3.7; and provided that the substituents represented by y and z are different.

M is preferably 2Li, 2Na, 2K, Mg, Ca, Ba, Al, Si, Sn, Pb, Rh, Sc, Ti, V, Cr, Mn, Fe, Co, Ni, Cu, Zn, AlX, GaX, InX or $SiX_2$, where in X is OH or Cl, more preferably Sc, Ti, Va, Cr, Mn, Fe, Co, Zn, Ni and Cu, especially Cu or Ni and more especially Cu.

Preferably $R^1$ is H; unsubstituted $C_{1-4}$alkyl (especially methyl); or $C_{1-4}$alkyl substituted with 1 or 2, particularly 1, water solubilising groups, especially water solubilising groups selected from —OH, —$CO_2H$, —$SO_3H$ and —$PO_3H_2$. More preferably $R^1$ is H or methyl.

$R^2$ is preferably optionally substituted $C_{1-12}$alkyl.

In one preferred embodiment $R^2$ is optionally substituted $C_{1-4}$alkyl, especially $C_{1-4}$alkyl substituted with 1 or 2, particularly 1, water solubilising groups, especially water solubilising groups selected from —OH, —$CO_2H$, —$SO_3H$ and —$PO_3H_2$.

In another preferred embodiment $R^2$ is $C_{1-4}$alkyl with a phenyl substituent carrying 1 or 2, particularly 2, water solubilising groups, especially water solubilising groups selected from —$CO_2H$, —$SO_3H$ and —$PO_3H_2$ and more especially —$SO_3H$.

In a third preferred embodiment $R^2$ is $C_{1-8}$alkyl substituted with 2 or more water solubilising groups, especially water solubilising groups selected from —OH, —$CO_2H$, —$SO_3H$ and —$PO_3H_2$. In the third preferred embodiment it is especially preferred that $R^2$ is $C_{1-8}$alkyl substituted with 2 or more, preferably 4 or more, —OH groups and optionally other substituents, especially substituents selected from the group consisting of —$CO_2H$, —$SO_3H$ and —$PO_3H_2$.

Preferably $R^3$ is H; unsubstituted $C_{1-4}$alkyl (especially methyl); or $C_{1-4}$alkyl substituted with 1 or 2, particularly 1, water solubilising group, especially water solubilising groups selected from —OH, —$CO_2H$, —$SO_3H$ and —$PO_3H_2$. More preferably $R^3$ is H or methyl.

Preferably $R^4$ comprises optionally substituted alkyl, optionally substituted heterocyclyl or optionally substituted aryl.

More preferably $R^4$ comprises optionally substituted $C_{1-12}$alkyl or optionally substituted phenyl.

In one preferred embodiment $R^4$ is optionally substituted $C_{1-4}$alkyl, especially $C_{1-4}$alkyl substituted with 1 or 2, particularly 1, water solubilising groups, especially water solubilising groups selected from —OH, —$CO_2H$, —$SO_3H$ and —$PO_3H_2$.

In another preferred embodiment $R^4$ is $C_{1-4}$alkyl with a phenyl or hetrocycylyl substituent carrying 1 or 2, particularly 2, water solubilising groups, (either bound directly to the ring or via another substituent) especially water solubilising groups selected from —$CO_2H$, —$SO_3H$ and —$PO_3H_2$ and more especially —$SO_3H$.

In a third preferred embodiment $R^4$ is $C_{1-8}$alkyl substituted with 2 or more water solubilising groups, especially water solubilising groups selected from —OH, —$CO_2H$, —$SO_3H$ and —$PO_3H_2$. In the third preferred embodiment it is especially preferred that $R^4$ is $C_{1-8}$alkyl substituted with 2 or more, preferably 4 or more, —OH groups and optionally other substituents, especially substituents selected from the group consisting of —$CO_2H$, —$SO_3H$ and —$PO_3H_2$.

Preferably w has a value in the range of 0.1 to 1.0 and more preferably in the range of 0.1 to 0.25.

Preferably x has a value in the range of 0.1 to 3.0, more preferably in the range of 0.1 to 2.0 and especially in the range of 0.1 to 0.25.

Preferably y has a value in the range of 1.0 to 3.0.

Preferably z has a value in the range of 1.0 to 3.0.

Preferably w+x+y+z is in the range 2 to 4, more preferably w+x+y+z is in the range of 3 to 4. It is especially preferred that w+x+y+z is 4.

In a preferred embodiment the substituents represented by w, x, y and z are bound to the phthalocyanine ring only through the β-position on the phthalocyanine ring.

Preferred optional substituents which may be present on $R^1$, $R^2$, $R^3$ and $R^4$ are independently selected from: optionally substituted alkoxy (preferably $C_{1-4}$-alkoxy), optionally substituted aryl (preferably phenyl), optionally substituted aryloxy (preferably phenoxy), optionally substituted heterocyclic, polyalkylene oxide (preferably polyethylene oxide or polypropylene oxide), carboxy, phosphato, sulfo, nitro, cyano, halo, ureido, —$SO_2F$, hydroxy, ester, —$NR^aR^b$, —$COR^a$, —$CONR^aR^b$, —$NHCOR^a$, carboxyester, sulfone, and —$SO_2NR^aR^b$, wherein $R^a$ and $R^b$ are each independently H or optionally substituted alkyl (especially $C_{1-4}$-alkyl). When $R^1$, $R^2$, $R^3$ and $R^4$ are aryl they may also carry an optionally substituted alkyl (especially $C_{1-4}$-alkyl) substituent. Optional substituents for any of the substituents described for $R^1$, $R^2$, $R^3$ and $R^4$ may be selected from the same list of substituents.

Preferably, collectively, $R^1$, $R^2$, $R^3$ or $R^4$ carry one or more water solubilising substituents, more preferably, collectively, $R^1$, $R^2$, $R^3$ or $R^4$ carry one or more substituents selected from the group consisting of —OH, —$CO_2H$, —$SO_3H$ and —$PO_3H_2$. It is especially preferred that $R^2$ and/or $R^4$ carry one or more substituents selected from the group consisting of —OH, —$CO_2H$, —$SO_3H$ and —$PO_3H_2$.

One preferred embodiment of the invention provides a mixture of compounds of Formula (2) and salts thereof:

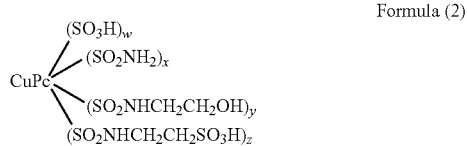

Formula (2)

wherein:

Pc represents a phthalocyanine nucleus of formula;

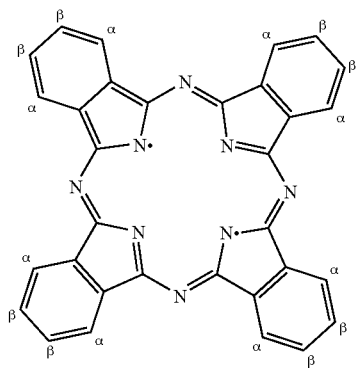

w is 0.1 to 3.7;
x is 0.1 to 3.7;
y is 0.1 to 3.7; and
z is 0.1 to 3.7.

Preferences for w, x, y and z are as described above.

The compounds of Formula (1) are also preferably free from fibre reactive groups. The term fibre reactive group is well known in the art and is described for example in EP 0356014 A1. Fibre reactive groups are capable, under suitable conditions, of reacting with the hydroxyl groups present in cellulosic fibres or with the amino groups present in natural fibres to form a covalent linkage between the fibre and the dye. As examples of fibre reactive groups excluded from the compounds of Formula (1) there may be mentioned aliphatic sulfonyl groups which contain a sulfate ester group in beta-position to the sulfur atom, e.g. beta-sulfato-ethylsulfonyl groups, alpha, beta-unsaturated acyl radicals of aliphatic carboxylic acids, for example acrylic acid, alpha-chloro-acrylic acid, alpha-bromoacrylic acid, propiolic acid, maleic acid and mono- and dichloro maleic; also the acyl radicals of acids which contain a substituent which reacts with cellulose in the presence of an alkali, e.g. the radical of a halogenated aliphatic acid such as chloroacetic acid, beta-chloro and beta-bromopropionic acids and alpha, beta-dichloro- and dibromopropionic acids or radicals of vinylsulfonyl- or beta-chloroethylsulfonyl- or beta-sulfatoethyl-sulfonyl-endo-methylene cyclohexane carboxylic acids. Other examples of cellulose reactive groups are tetrafluorocyclobutyl carbonyl, trifluoro-cyclobutenyl carbonyl, tetrafluorocyclobutylethenyl carbonyl, trifluoro-cyclobutenylethenyl carbonyl; activated halogenated 1,3-dicyanobenzene radicals; and heterocyclic radicals which contain 1, 2 or 3 nitrogen atoms in the heterocyclic ring and at least one cellulose reactive substituent on a carbon atom of the ring, for example a triazinyl halide.

Acid or basic groups on the compounds of Formula (1), particularly acid groups, are preferably in the form of a salt. Thus, the Formulae shown herein include the compounds in salt form.

Preferred salts are alkali metal salts, especially lithium, sodium and potassium, ammonium and substituted ammonium salts (including quaternary amines such as (($CH_3)_4N^+$) and mixtures thereof. Especially preferred are salts with sodium, lithium, ammonia and volatile amines, more especially sodium salts. Compounds of Formula (1) may be converted into a salt using known techniques.

The compounds of Formula (1) may exist in tautomeric forms other than those shown in this specification. These tautomers are included within the scope of the present invention.

The compounds of Formula (1) may be prepared by any method known in the art.

Preferably the compounds of Formula (1) are prepared by condensing a phthalocyanine carrying sulfonyl chloride groups and sulfonic acid groups with ammonia and compounds of formula $HNR^1R^2$ and $HNR^3R^4$ wherein $R^1$, $R^2$, $R^3$ and $R^4$ are as hereinbefore defined. Many compounds of formula $HNR^1R^2$ and $HNR^3R^4$ are commercially available, for example: ethanolamine, homotaurine and taurine, others may be readily prepared by a person of ordinary skill. The condensation is preferably performed in water at a pH above 7. Typically the condensation is performed at a temperature of 30 to 70° C. and the condensation is usually complete in less than 24 hours. Ammonia and the compounds of formula $HNR^1R^2$ and $HNR^3R^4$ may be used as a mixture or condensed sequentially with the said phthalocyanine compound.

Phthalocyanines carrying sulfonyl chloride groups and sulfonic acid groups may be prepared by chlorosulfonating phthalocyanine pigment using, for example, chlorosulfonic acid and optionally a chlorinating agent (e.g. $POCl_3$, $PCl_5$ or thionylchloride).

When it is required that the substituents represented by w, x, y and z should be bound to the phthalocyanine ring only through the β-position then preferably sulfonated phthalocyanine is obtainable by a process which comprises cyclisation of 4-sulfophthalic acid or an analogue thereof. Preferred analogues of phthalic acid include, phthalonitrile, iminoisoindoline, phthalic anhydride, phthalimide or phthalamide.

The cyclisation reaction is carried out in the presence of a suitable source of ammonia (if required), and (if required) a suitable metal salt, for example $CuCl_2$, and a base such as 1,8-diazabicyclo[5.4.0]undec-7-ene (DBU).

The β-tetrasulfophthalocyanine formed by the cyclisation reaction is then reacted with a chlorinating agent such as chlorosulfonic acid, $POCl_3$, $PCl_5$ or thionylchloride (either alone or as a mixture) to yield phthalocyanines carrying β-sulfonyl chloride groups and β-sulfonic acid groups. Compounds of Formula (1), with substituents only in the β-position, are then formed by reacting with ammonia and compounds of formula $HNR^1R^2$ and $HNR^3R^4$ as described above.

The compounds of Formula (1) have attractive, strong cyan shades and are valuable colorants for use in the preparation of ink-jet printing inks. They benefit from a good balance of solubility, storage stability and fastness to water, ozone and light.

According to a second aspect of the present invention there is provided a composition comprising a mixture of compounds of Formula (1) as described in the first aspect of the invention and a liquid medium.

Preferred compositions according to the second aspect of the invention comprise:
(a) from 0.01 to 30 parts of a mixture of compounds of Formula (1) according to the first aspect of the invention; and
(b) from 70 to 99.99 parts of a liquid medium;

wherein all parts are by weight.

Preferably the number of parts of (a)+(b)=100.

The number of parts of component (a) is preferably from 0.1 to 20, more preferably from 0.5 to 15, and especially from 1 to 5 parts. The number of parts of component (b) is preferably from 80 to 99.9, more preferably from 85 to 99.5 and especially from 95 to 99 parts.

Preferably component (a) is completely dissolved in component (b). Preferably component (a) has a solubility in component (b) at 20° C. of at least 10%. This allows the preparation of liquid dye concentrates that may be used to prepare more dilute inks and reduces the chance of the dye precipitating if evaporation of the liquid medium occurs during storage.

The inks may be incorporated in an ink-jet printer as a high concentration cyan ink, a low concentration cyan ink or both a high concentration and a low concentration ink. In the latter case this can lead to improvements in the resolution and quality of printed images. Thus the present invention also provides a composition (preferably an ink) where component (a) is present in an amount of 2.5 to 7 parts, more preferably 2.5 to 5 parts (a high concentration ink) or component (a) is present in an amount of 0.5 to 2.4 parts, more preferably 0.5 to 1.5 parts (a low concentration ink).

Preferred liquid media include water, a mixture of water and organic solvent and organic solvent free from water. Preferably the liquid medium comprises a mixture of water and organic solvent or organic solvent free from water.

When the liquid medium (b) comprises a mixture of water and organic solvent, the weight ratio of water to organic solvent is preferably from 99:1 to 1:99, more preferably from 99:1 to 50:50 and especially from 95:5 to 80:20.

It is preferred that the organic solvent present in the mixture of water and organic solvent is a water-miscible organic solvent or a mixture of such solvents. Preferred water-miscible organic solvents include $C_{1-6}$alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones, preferably sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP-A-425,150.

When the liquid medium comprises organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents are any of the hereinbefore-described water-miscible organic solvents and mixtures thereof. Preferred water-immiscible solvents include, for example, aliphatic hydrocarbons; esters, preferably ethyl acetate; chlorinated hydrocarbons, preferably $CH_2Cl_2$; and ethers, preferably diethyl ether; and mixtures thereof.

When the liquid medium comprises a water-immiscible organic solvent, preferably a polar solvent is included because this enhances solubility of the mixture of phthalocyanine dyesin the liquid medium. Examples of polar solvents include $C_{1-4}$-alcohols.

In view of the foregoing preferences it is especially preferred that where the liquid medium is organic solvent free from water it comprises a ketone (especially methyl ethyl ketone) and/or an alcohol (especially a $C_{1-4}$-alkanol, more especially ethanol or propanol).

The organic solvent free from water may be a single organic solvent or a mixture of two or more organic solvents. It is preferred that when the liquid medium is organic solvent free from water it is a mixture of 2 to 5 different organic solvents. This allows a liquid medium to be selected that gives good control over the drying characteristics and storage stability of the ink.

Liquid media comprising organic solvent free from water are particularly useful where fast drying times are required and particularly when printing onto hydrophobic and non-absorbent substrates, for example plastics, metal and glass.

The liquid media may of course contain additional components conventionally used in ink-jet printing inks, for example viscosity and surface tension modifiers, corrosion inhibitors, biocides, kogation reducing additives and surfactants which may be ionic or non-ionic.

Although not usually necessary, further colorants may be added to the ink to modify the shade and performance properties. Examples of such colorants include C.I. Direct Yellow 86, 132, 142 and 173; C.I. Direct Blue 307; C.I. Food Black 2; C.I. Direct Black 168 and 195; and C.I. Acid Yellow 23.

It is preferred that the composition according to the invention is ink suitable for use in an ink-jet printer. Ink suitable for use in an ink-jet printer is ink which is able to repeatedly fire through an ink-jet printing head without causing blockage of the fine nozzles.

Ink suitable for use in an ink-jet printer preferably has a viscosity of less than 20 cP, more preferably less than 10 cP, especially less than 5 cP, at 25° C.

Ink suitable for use in an ink-jet printer preferably contains less than 500 ppm, more preferably less than 250 ppm, especially less than 100 ppm, more especially less than 10 ppm in total of divalent and trivalent metal ions (other than any divalent and trivalent metal ions bound to a colorant of Formula (1) or any other colourant or additive incorporated in the ink).

Preferably ink suitable for use in an ink-jet printer has been filtered through a filter having a mean pore size below 10 μm, more preferably below 3 μm, especially below 2 μm, more especially below 1 μm. This filtration removes particulate matter that could otherwise block the fine nozzles found in many ink-jet printers.

Preferably ink suitable for use in an ink-jet printer contains less than 500 ppm, more preferably less than 250 ppm, especially less than 100 ppm, more especially less than 10 ppm in total of halide ions.

A third aspect of the invention provides a process for forming an image on a substrate comprising applying ink suitable for use in an ink-jet printer, according to the second aspect of the invention, thereto by means of an ink-jet printer.

The ink-jet printer preferably applies the ink to the substrate in the form of droplets that are ejected through a small orifice onto the substrate. Preferred ink-jet printers are piezoelectric ink-jet printers and thermal ink-jet printers. In thermal ink-jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink-jet printers the oscillation of a small crystal causes ejection of the ink from the orifice. Alternately the ink can be ejected by an electromechanical actuator connected to a moveable paddle or plunger, for example as described in International Patent Application WO00/48938 and International Patent Application WO00/55089.

The substrate is preferably paper, plastic, a textile, metal or glass, more preferably paper, an overhead projector slide or a textile material, especially paper.

Preferred papers are plain or treated papers which may have an acid, alkaline or neutral character. Glossy papers are especially preferred. Photographic quality papers are especially preferred.

A fourth aspect of the present invention provides a material preferably paper, plastic, a textile, metal or glass, more preferably paper, an overhead projector slide or a textile material, especially paper more especially plain, coated or treated papers printed with a mixture of compounds as described in the first aspect of the invention, a composition according to the second aspect of the invention or by means of a process according to the third aspect of the invention.

It is especially preferred that the printed material of the fourth aspect of the invention is a print on a photographic quality paper printed using a process according to the third aspect of the invention.

A fifth aspect of the present invention provides an ink-jet printer cartridge comprising a chamber and an ink suitable for use in an ink-jet printer wherein the ink is in the chamber and the ink is as defined in the second aspect of the present invention. The cartridge may contain a high concentration ink and a low concentration ink, as described in the second aspect of the invention, in different chambers.

The invention is further illustrated by the following Examples in which all parts and percentages are by weight unless otherwise stated.

EXAMPLES

Analysis of Compounds of Formula (1)

In all of the Examples below the phthalocyanine is formed by cyclisation of 4-sulfophthalic acid and in all the Examples below it was confirmed by mass spec that the product had 4 substituents (i.e. w+x+y+z=4). The ratios of w, x, y and z were determined by elemental analysis. In the results obtained by elemental analysis w plus x plus y and z is often not exactly 4. A skilled person would not be surprised by this and would know that this discrepancy is due to the presence of impurities. The presence of these impurities and their effect on the estimated values of x, y and z would be well known to a person skilled in the art who would appreciate that the value of x plus y plus z should not exceed 4 and who would treat the experimentally determined values of x, y and z as indicative of the true ratios of the groups. Also with some compounds according to the present invention it is not possible using elemental analysis to discriminate between the different sulfonamide substituents. In these cases x, y and z are quoted as the sum of all the sulfonamide groups which cannot be differentiated e.g. (x+y+z) or (y+z). Where it was not possible to analyse the compounds formed by elemental analysis the expected values of w, x, y and z are given.

Example 1

Preparation of a Mixture of Compounds of Formula

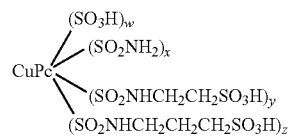

Wherein all substituents are attached via the β-position.

Stage 1

Potassium 4-sulfophthalic acid (56.8 g), urea (120 g), CuCl$_2$ (6.9 g), ammonium molybdate (1.2 g) and 1,8-diazabicyclo[5.4.0]undec-7-ene (DBU) (7.5 g) were mixed in a reaction vessel. The mixture was then warmed in stages, 130° C./30 minutes, 150° C./30 minutes, 180° C./30 minutes and then to 220° C., over 2 h and the melt which formed was stirred at 220° C. for a further 2 h. The solid that formed was extracted 4 times with hot water (4×200 ml) and the extract was filtered to remove insoluble material. The resultant filtrate was stirred at between 60° C. to 70° C. and then sufficient NaCl was added to give a 7% salt solution. Stirring was continued and the solid that precipitated was filtered, washed with a 10% salt solution (200 ml) and pulled dry by vacuum. The resultant damp solid (77.6 g) was slurried in acetone, filtered and dried first at room temperature and then at 50° C.

Stage 2

Preparation of the Title Product:

Phosphorous oxychloride (11.3 ml) was added drop wise to chlorosulfonic acid (108 ml) over 5-10 minutes while keeping the temperature below 30° C. When all the $POCl_3$ had been added, the product of stage 1 (35 g) was added portion-wise, keeping the reaction temperature below 65° C. The temperature of the reaction mixture was then gradually increased to 138-140° C., the reaction was held at this temperature for 6 h and then stirred overnight at room temperature. The next day the reaction mixture was added to water/ice (100 g/300 g). The solid that precipitated was filtered, washed with ice-cold water and pulled dry using a vacuum pump. Half of the resultant damp paste (66 g) in ice/water (150/100 g) was added to a mixture of taurine (1.98 g), homotaurine (4.43 g), concentrated ammonia 35% w/w (0.48 ml) and water (100 ml) at 0°-5° C. This mixture was stirred at 0° to 5° C. (pH 9-9.5) for 2.5 hour, at room temperature overnight and then at 40° C., pH 9-9.5 for 2 hour. The reaction temperature was then increased to 60° C. and the pH adjusted to 10-10.5 with NaOH solution and the mixture was stirred for a further 3 hours. At the end of this time the reaction mixture was cooled to room temperature and the pH was lowered to 7 with HCl solution. The reaction mixture was then dialysed versus deionised water and the resultant precipitate filtered and then dried to give 13.7 g of product wherein w=1.2 and x+y+z=2.7.

Example 2

The compounds of Example 2 was prepared as described in Example 1, except that taurine (1.99 g), homotaurine (2.2 g) and concentrated ammonia 35% w/w (0.96 ml) were used and 14.8 g of product was obtained. Based on the ratio of the reactants and reaction conditions used in Example 2 it is expected that w should be 1, x should be 1, y should be 1 and z should be 1.

Example 3

Preparation of a Mixture of Compounds of Formula

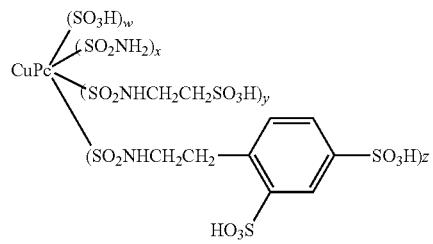

Wherein all substituents are attached via the β-position.

Stage 1

Preparation of 2'-aminoethylbenzene 2,4 disulphonic acid

Phenylethylamine (24.2 g) was added drop wise to 30% oleum (125 ml) while keeping the reaction temperature at less than 60° C. by ice cooling. The mixture was then heated to between 100 and 110° C. for 4 h, cooled and drowned into ice/water (1200 cc) at 10° C. Calcium hydroxide (170 g) was added and the reaction mixture was stirred for 30 minutes. The mixture was then filtered to remove precipitated material and the filtrate evaporated to dryness, washed with ethanol and dried to give title product as an off white solid (60 g, 80% strength).

Stage 2

Phosphorous oxychloride ($POCl_3$) (7.2 ml) was added drop wise to chlorosulfonic acid (67 ml) over 5 to 10 minutes while keeping the temperature below 30° C. When all the $POCl_3$ had been added, the product of Example 1, Stage 1 (22 g) was added portion-wise, keeping the reaction temperature below 65° C. The temperature of the reaction mixture was then gradually increased to between 138 to 140° C. and the reaction was held at this temperature for 5.5 h then stirred overnight at room temperature. The next day the reaction mixture was added to water/ice (100 g/300 g). The solid that precipitated was collected by filtration, washed with ice-cold water and pulled dry using a vacuum pump.

Stage 3

Half of the damp paste made in Stage 2 was added, in water (150 ml), to a mixture of taurine (2.19 g), 2'-aminoethylbenzene 2,4 disulphonic acid (6.6 g) (from Stage 1), 1M ammonia solution (2.5 ml) and water (100 ml) at 0°-5° C. and the pH was adjusted to 9.5 with sodium hydroxide solution. The mixture was stirred first at 0° to 10° C. (pH 9.3 to 9.4) for 2 h, then at room temperature overnight and then at 40 to 50° C., pH 9.3 to 9.4 for 2 h. The reaction temperature was then increased to 70 to 80° C., the pH adjusted to 12 (with NaOH solution) and the mixture stirred for a further 4 hours. At the end of this time the reaction mixture was cooled to room temperature and the pH was lowered to 9.5 with HCl solution. The reaction mixture was then dialysed with deionised water and then dried to give 11.2 g of product. Analysis showed that, w=2.1, x=0.6 and y+z=1.8

Example 4

The compounds of Example 4 were prepared as in Example 3 except that in Stage 3 taurine (2.4 g), 2'-aminoethylbenzene 2,4 disulphonic acid (7.03 g) and 1M ammonia solution (1 ml) were used in place of taurine (2.19 g), 2'-aminoethylbenzene 2,4 disulphonic acid (6.6 g), and 1M ammonia solution (2.5 ml). This gave 12 g of product wherein w=1.7, x=0.3 and y+z=2.2

Example 5

The compounds of Example 5 were prepared as in Example 3 except that in Stage 3 taurine (0.65 g), 2'-aminoethylbenzene 2,4 disulphonic acid (11.5 g) and 1M ammonium chloride solution (2.5 ml) were used in place of taurine (2.19 g), 2'-aminoethylbenzene 2,4 disulphonic acid (6.6 g), and 1M ammonia solution (2.5 ml). This gave 10.8 g of product. Based on the ratio of the reactants and reaction conditions used it is expected that w should be 0.25, x should be 0.25, y should be 0.5 and z should be 3.

Example 6

The compounds of Example 6 were prepared as in Example 3 except that in Stage 3 taurine (3.9 g), 2'-aminoethylbenzene 2,4 disulphonic acid (1.9 g) and 1M ammonium chloride solution (2.5 ml) were used in place of taurine (2.19 g), 2'-aminoethylbenzene 2,4 disulphonic acid (6.6 g), and 1M ammonia solution (2.5 ml). This gave 11.6 g of product wherein w=0.8, x=1.8 and y+z=0.8.

Example 7

The compounds of Example 7 were prepared as in Example 3 except that in Stage 3 taurine (1 g), 2'-aminoethylbenzene 2,4 disulphonic acid (8.7 g) and 1M ammonium chloride solution (0.8 ml) were used in place of taurine (2.19 g), 2'-aminoethylbenzene 2,4 disulphonic acid (6.6 g), and 1M ammonia solution (2.5 ml). This gave 10.8 g of product. Based on the ratio of the reactants and the reaction conditions used it is expected that w should be 0.1, x should be 0.1, y should be 1 and z should be 2.8.

Example 8

The compounds of Example 8 were prepared as in Example 3 except that in Stage 3 taurine (2.8 g), 2'-aminoethylbenzene 2,4 disulphonic acid (2.89 g) and 1M ammonium chloride solution (0.8 ml) were used in place of taurine (2.19 g), 2'-aminoethylbenzene 2,4 disulphonic acid (6.6 g), and 1M ammonia solution (2.5 ml). This gave 9.5 g of product wherein w=1.2, x=1.4 and y+z=0.9

Example 9

Preparation of a Mixture of Compounds of Formula

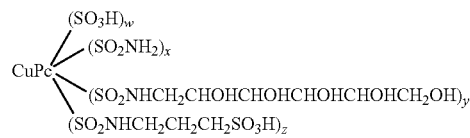

Wherein all substituents are attached via the β-position.

Stage 1

Stage 1 was carried out as in Example 3, Stage 2.

Stage 2

Half of the damp paste prepared in Stage 1, in water (100 ml), was added to a mixture of taurine (2.4 g), D-glucamine (3.44 g), 1M ammonium chloride solution (1 ml) and water (150 ml) at 0° to 5° C. The pH was adjusted to 9 with sodium hydroxide solution. This mixture was stirred at 0° to 5° C. (pH 9 to 9.2) for 2 h, then at room temperature overnight and then at 40 to 50° C., pH 9 to 9.2 for 2 h. The reaction temperature was then increased to 80 to 90° C. and the pH adjusted to 12 with NaOH solution and the mixture was stirred for a further 3 hours. At the end of this time the reaction mixture was cooled to room temperature and the pH was lowered to 9 with HCl solution. Methanol (300 ml) was then added drop wise with stirring and the precipitated solid was filtered and washed with methanol (50 ml). The resultant paste was dissolved in water (200 ml), dialysed and then dried to give 9.6 g of product wherein w=0.5, x=0.1, and y+z=3.0

Example 10

The compounds of Example 10 were prepared as described in Example 9 except that in Stage 2 taurine (2.19 g), D-glucamine (3.17 g) and 1M ammonium chloride solution (2.5 ml) were used in place of taurine (2.4 g), D-glucamine (3.44 g) and 1M ammonium chloride solution (1 ml). This give 9.7 g of product wherein w=0.5, x=0.2 and y+z=3.0

Example 11

Preparation of a Mixture of Compounds of Formula

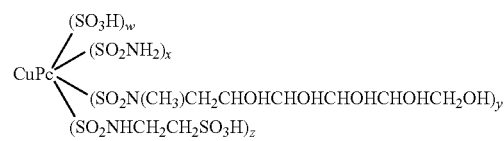

Wherein all substituents are attached via the β-position.

The compounds of Example 11 was prepared as described in Example 9 except that N-methyl glucamine (2.96 g) was used in place of D-glucamine (3.44 g) to give 7.7 g of product. Based on the ratio of the reactants and reaction conditions used it is expected that w should be 0.1, x should be 0.1, y should be 1.9 and z should be 1.9.

Example 12

The compounds of Example 12 was prepared as in Example 11, except that N-methyl glucamine (2.73 g) was used to give 7.65 g of product. Based on the ratio of the reactants and the reaction conditions it is expected that w should be 0.25, x should be 0.25, y should be 1.75 and z should be 1.75.

Example 13

Preparation of a Mixture of Compounds of Formula

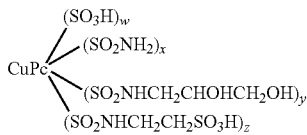

Wherein all substituents are attached via the β-position.

Stage 1

Stage 1 was carried out as in Example 3, stage 2.

Stage 2

Half of the damp paste prepared in Stage 1, in water (150 ml), was added a mixture of taurine (2.19 g), 3 amino-1,2-propandiol (1.65 g), 1M ammonia solution (2.5 ml) and water (100 ml) at 0°-5° C. The pH was adjusted to 9.4 with sodium hydroxide solution. The mixture was stirred at 0° to 10° C. (pH 9.3 to 9.4) for 2 h, at room temperature overnight and then at 40-50° C., pH 9.3 to 9.4 for 1 h. The reaction temperature was then increased to 70 to 80° C., the pH adjusted to 12, with NaOH solution, and the mixture stirred for a further 3 hours. At the end of this time the reaction mixture was cooled to room temperature and the pH was lowered to 10 with HCl solution and filtered. The filtrate was dialysed and then dried to give 9.75 g of product. Based on the ratio of the reactants and the reaction conditions used it is expected that w should be 0.25, x should be 0.25, y should be 1.75 and z should be 1.75.

Example 14

The compounds of Example 14 were prepared as in Example 13 except that taurine (2.4 g), 3 amino-1,2-propandiol (1.8 g) and 1M ammonia solution (1 ml) were used in place of taurine (2.19 g), 3 amino-1,2-propandiol (1.65 g) and 1M ammonia solution (2.5 ml). This gave 11.5 g of product. Based on the ratio of the reactants and the reaction conditions used it is expected that w should be 0.1, x should be 0.1, y should be 1.9 and z should be 1.9.

Example 15

The compound of Example 15 was prepared as in Example 13 except that taurine (3.94 g), 3 amino-1,2-propandiol (0.45 g) and 1M ammonia solution (2.5 ml) were used in place of taurine (2.19 g), 3 amino-1,2-propandiol (1.65 g) and 1M ammonia solution (2.5 ml). This gave 9.8 g of product wherein w=1.1, x=1.4 and y+z=2.4

Example 16

The compound of Example 16 was prepared as in Example 13 except that taurine (3.67 g), 3 amino-1,2-propandiol (0.91 g) and 1M ammonia solution (1 ml) were used in place of taurine (2.19 g), 3 amino-1,2-propandiol (1.65 g) and 1M ammonia solution (2.5 ml). This gave 9.45 g of product wherein w=0.5, x=0.4 and, y+z=3.4.

Example 17

Preparation of a Mixture of Compounds of Formula

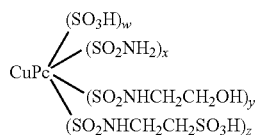

Wherein all substituents are attached via a β-positions.

Phosphorous oxychloride (11.3 ml) was added dropwise to chlorosulfonic acid (108 ml) over 5-10 minutes while keeping the temperature below 30° C. When all the $POCl_3$ had been added, the product of Example 1, stage 1 (35 g) was added portion-wise while keeping the reaction temperature below 65° C. The temperature of the reaction mixture was then gradually increased to 138 to 40° C., held at this temperature for 6 h and then stirred overnight at room temperature. The next day the reaction mixture was added to a mixture of water and ice (100 g/300 g). The solid that precipitated was filtered, washed with ice cold water and pulled dry using a vacuum pump. Half the resultant damp paste (62 g) in ice/water (200 g/100 g) was added to a mixture of taurine (5.8 g), ethanolamine (0.48 ml), concentrated ammonia 35% w/w (0.24 ml) and water (50 ml) at 0° to 5° C. This mixture was stirred at 0° to 10° C. (pH>9.5) for 2 hours and then stirred at room temperature overnight. The next day, the reaction mixture temperature was raised to 40° C. and the reaction was stirred at pH 9-9.5 for 2 hours. The reaction temperature was then increased to 80° C. and the pH adjusted to pH 10-10.5 with NaOH solution and stirred for 3 hours. At the end of this time the reaction mixture was cooled to room temperature and the pH lowered to pH7 with HCl solution. The reaction mixture was then dialysed against deionised water and the resultant precipitate filtered-off and then dried to give 14 g of product wherein w=1.8 and x+y+z=3.3.

Example 18

The compound of Example 18 was prepared as in Example 17 except that taurine (3.99 g), ethanolamine (0.97 g) and concentrated ammonia 35% w/w (0.48 ml) were used in place of taurine (5.8 g), ethanolamine (0.48 ml) and concentrated ammonia 35% w/w (0.24 ml) to give 13.9 g of product wherein w=1.1 and x+y+z=3.3.

Inks and Ink-Jet Printing

Inks may be prepared by dissolving 3 g of a dye of any one of Examples 1 to 18 in 97 ml of a liquid medium consisting of 5 parts 2-pyrrolidone; 5 parts thiodiethylene glycol; 1 part Surfynol™ 465 and 89 parts water and adjusting the pH to between pH 8 to 9 with sodium hydroxide. Surfynol™ 465 is a surfactant from Air Products.

Ink-Jet Printing

Inks, prepared as described above, should then be filtered through a 0.45 micron nylon filter and may then be incorporated into empty print cartridges using a syringe.

These inks can be printed onto either plain paper or a specialist ink-jet medium.

Print Evaluation

Prints can be tested for ozone fastness by exposure to 1 ppm ozone at 40° C., 50% relative humidity, for 24 hrs in a Hampden 903 Ozone cabinet. Fastness of the printed ink to ozone can be judged by the difference in the optical density before and after exposure to ozone.

Light-fastness of the printed image may be assessed by fading the printed image in an Atlas Ci5000 Weatherometer for 100 hours and then measuring the change in the optical density.

Optical density measurements can be performed using a Gretag spectrolino spectrophotometer set to the following parameters:

| | |
|---|---|
| Measuring Geometry | 45°/0° |
| Spectral Range | 380-730 nm |
| Spectral Interval | 10 nm |
| Illuminant | D65 |
| Observer | 2° (CIE 1931) |
| Density | Ansi A |
| External Filler | None |

Light and Ozone fastness may be assessed by the percentage change in the optical density of the print, where a lower figure indicates higher fastness, and the degree of fade. The degree of fade can be expressed as ΔE and a lower figure indicates higher light fastness. ΔE is defined as the overall change in the CIE colour co-ordinates L, a, b of the print and is expressed by the equation $\Delta E=(\Delta L^2+\Delta a^2+\Delta b^2)^{0.5}$.

Further Inks

The inks described in Tables A and B may be prepared using the Compound described in the above Example. Numbers quoted refer to the number of parts of the relevant ingredient and all parts are by weight. The inks may be applied to paper by thermal or piezo ink-jet printing.

The following abbreviations are used in Tables A and B:
PG=propylene glycol
DEG=diethylene glycol
NMP=N-methyl pyrollidone
DMK=dimethylketone
IPA=isopropanol
MEOH=methanol
2P=2-pyrollidone
MIBK=methylisobutyl ketone
P12=propane-1,2-diol
BDL=butane-2,3-diol
CET=cetyl ammonium bromide
PHO=$Na_2HPO_4$ and
TBT=tertiary butanol
TDG=thiodiglycol

TABLE A

| Dye Content | Water | PG | DEG | NMP | DMK | NaOH | Na Stearate | IPA | MEOH | 2P | MIBK |
|---|---|---|---|---|---|---|---|---|---|---|---|
| 2.0 | 80 | 5 | | 6 | 4 | | | | | 5 | |
| 3.0 | 90 | | 5 | 5 | | 0.2 | | | | | |
| 10.0 | 85 | 3 | | 3 | 3 | | | | 5 | 1 | |
| 2.1 | 91 | | 8 | | | | | | | | 1 |
| 3.1 | 86 | 5 | | | | | 0.2 | 4 | | | 5 |
| 1.1 | 81 | | | 9 | | 0.5 | 0.5 | | | 9 | |
| 2.5 | 60 | 4 | 15 | 3 | 3 | | | 6 | 10 | 5 | 4 |
| 5 | 65 | | 20 | | | | | 10 | | | |
| 2.4 | 75 | 5 | 4 | | 5 | | | | 6 | | 5 |
| 4.1 | 80 | 3 | 5 | 2 | 10 | | 0.3 | | | | |
| 3.2 | 65 | | 5 | 4 | 6 | | | 5 | 4 | 6 | 5 |
| 5.1 | 96 | | | | | | | 4 | | | |
| 10.8 | 90 | 5 | | | | | | 5 | | | |
| 10.0 | 80 | 2 | 6 | 2 | 5 | | | 1 | | 4 | |
| 1.8 | 80 | | 5 | | | | | | | 15 | |
| 2.6 | 84 | | | 11 | | | | | | 5 | |
| 3.3 | 80 | 2 | | | 10 | | | | 2 | | 6 |
| 12.0 | 90 | | | | 7 | 0.3 | | 3 | | | |
| 5.4 | 69 | 2 | 20 | 2 | 1 | | | | | 3 | 3 |
| 6.0 | 91 | | | 4 | | | | | | 5 | |

TABLE B

| Dye Content | Water | PG | DEG | NMP | CET | TBT | TDG | BDL | PHO | 2P | PI2 |
|---|---|---|---|---|---|---|---|---|---|---|---|
| 3.0 | 80 | 15 | | | 0.2 | | | | | 5 | |
| 9.0 | 90 | | 5 | | | | | | 1.2 | | 5 |
| 1.5 | 85 | 5 | 5 | | 0.15 | 5.0 | 0.2 | | | | |
| 2.5 | 90 | | 6 | 4 | | | | | 0.12 | | |
| 3.1 | 82 | 4 | 8 | | 0.3 | | | | | | 6 |
| 0.9 | 85 | | 10 | | | | | 5 | 0.2 | | |
| 8.0 | 90 | | 5 | 5 | | | 0.3 | | | | |
| 4.0 | 70 | | 10 | 4 | | | | 1 | | 4 | 11 |
| 2.2 | 75 | 4 | 10 | 3 | | | | 2 | | 6 | |
| 10.0 | 91 | | | 6 | | | | | | 3 | |
| 9.0 | 76 | | 9 | 7 | | 3.0 | | | 0.95 | 5 | |
| 5.0 | 78 | 5 | 11 | | | | | | | 6 | |
| 5.4 | 86 | | | 7 | | | | | | 7 | |
| 2.1 | 70 | 5 | 5 | 5 | 0.1 | 0.2 | 0.1 | 5 | 0.1 | 5 | |
| 2.0 | 90 | | 10 | | | | | | | | |
| 2 | 88 | | | | | | 10 | | | | |
| 5 | 78 | | | 5 | | | 12 | | | 5 | |
| 8 | 70 | 2 | | 8 | | | 15 | | | 5 | |
| 10 | 80 | | | | | | | 8 | | 12 | |
| 10 | 80 | | 10 | | | | | | | | |

The invention claimed is:

1. A mixture of compounds of Formula (I) and salts thereof:

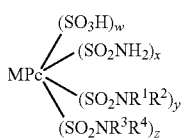

Formula (1)

wherein:
M is 2H, Si, a metal, an oxymetal group, a hydroxymetal group or a halometal group;
Pc represents a phthalocyanine nucleus of formula;

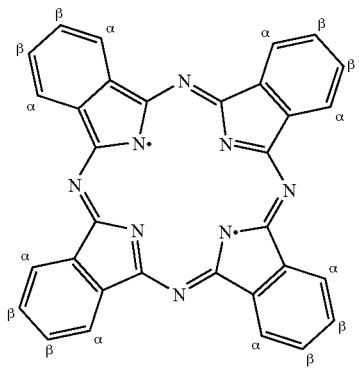

$R^1$ is H or optionally substituted $C_{1-4}$alkyl;
$R^2$ is optionally substituted alkyl or optionally substituted heterocyclyl;
$R^3$ is H or optionally substituted $C_{1-4}$alkyl;
$R^4$ is optionally substituted hydrocarbyl;
w is 0.1 to 3.7;
x is 0.1 to 3.7;
y is 0.1 to 3.7;
z is 0.1 to 3.7; and
provided that the substituents represented by y and z are different.

2. A mixture of compounds according to claim 1 wherein M is Cu.

3. A mixture of compounds according to claim 1 wherein $R^1$ is H or methyl.

4. A mixture of compounds according to claim 1 wherein $R^2$ is $C_{1-4}$alkyl substituted with 1 or 2 water solubilising groups selected from the group consisting of —OH, —$CO_2H$, —$SO_3H$ and —$PO_3H_2$.

5. A mixture of compounds according to claim 1 wherein $R^2$ is $C_{1-4}$alkyl with a phenyl substituent carrying 1 or 2 water solubilising groups selected from the group consisting of —$CO_2H$, —$SO_3H$ and —$PO_3H_2$.

6. A mixture of compounds according to claim 1 wherein $R^2$ is $C_{1-8}$alkyl substituted with 2 or more water solubilising groups selected from the group consisting of —OH, —$CO_2H$, —$SO_3H$ and —$PO_3H_2$.

7. A mixture of compounds according to claim 1 wherein $R^3$ is H or methyl.

8. A mixture of compounds according to claim 1 wherein $R^4$ is optionally substituted alkyl optionally substituted heterocyclyl or optionally substituted aryl.

9. A mixture of compounds according to claim 8 wherein $R^4$ is optionally substituted $C_{1-4}$alkyl.

10. A mixture of compounds according to claim 9 wherein $R^4$ is $C_{1-4}$alkyl substituted with 1 or 2 water solubilising groups selected from the group consisting of —OH, —$CO_2H$, —$SO_3H$ and —$PO_3H_2$.

11. A mixture of compounds according to claim 9 wherein $R^4$ is $C_{1-4}$alkyl with a phenyl or heterocycyl substituent carrying 1 or 2 water solubilising groups selected from the group consisting of —$CO_2H$, —$SO_3H$ and —$PO_3H_2$.

12. A mixture of compounds according to claim 1 wherein $R^4$ is $C_{1-8}$alkyl substituted with 2 or more water solubilising groups selected from the group consisting of —OH, —$CO_2H$, —$SO_3H$ and —$PO_3H_2$.

13. A mixture of compounds according to claim 1 wherein w has a value in the range of 0.1 to 1.0.

14. A mixture of compounds according to claim 1 wherein x has a value in the range of 0.1 to 1.0.

15. A mixture of compounds according to claim 1 wherein y has a value in the range of 1.0 to 3.0.

16. A mixture of compounds according to claim 1 wherein z has a value in the range of 1.0 to 3.0.

17. A mixture of compounds according to claim 1 wherein w+x+y+z is 4.

18. A mixture of compounds according to claim 1 wherein $R^2$ and/or $R^4$ carry one or more substituents selected from the group consisting of —OH, —$CO_2H$, —$SO_3H$ and —$PO_3H_2$.

19. A mixture of compounds according to claim 1 wherein the substituents represented by w, x, y and z are bound to the phthalocyanine ring only through the β-position on the phthalocyanine ring.

20. A composition comprising a mixture of compounds of Formula (1) as described in claim 1 and a liquid medium.

21. A composition according to claim 20 which is ink suitable for use in an ink-jet printer.

22. A process for forming an image on a substrate comprising applying ink suitable for use in an ink-jet printer, according to claim 21 thereto by means of an ink-jet printer.

23. A material printed with a mixture of compounds as described in claim 1.

24. An ink-jet printer cartridge comprising a chamber and an ink suitable for use in an ink-jet printer wherein the ink is in the chamber.

25. A material printed with a composition according to claim 20 or claim 21.

26. A material printed by a process according to claim 22.

* * * * *